(12) United States Patent
Chen et al.

(10) Patent No.: US 10,015,782 B2
(45) Date of Patent: Jul. 3, 2018

(54) MULTIPLE SUBFRAME SET CSI FEEDBACK

(71) Applicant: QUALCOMM INCORPORATED, San Diego, CA (US)

(72) Inventors: Wanshi Chen, San Diego, CA (US); Chao Wei, Beijing (CN); Neng Wang, Beijing (CN); Hao Xu, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 90 days.

(21) Appl. No.: 15/101,556

(22) PCT Filed: Jan. 6, 2015

(86) PCT No.: PCT/CN2015/070179
§ 371 (c)(1),
(2) Date: Jun. 3, 2016

(87) PCT Pub. No.: WO2015/103965
PCT Pub. Date: Jul. 16, 2015

(65) Prior Publication Data
US 2017/0041905 A1    Feb. 9, 2017

(30) Foreign Application Priority Data

Jan. 7, 2014   (WO) ................ PCT/CN2014/070233
Feb. 11, 2014  (WO) ................ PCT/CN2014/071952

(51) Int. Cl.
*H04W 4/00* (2018.01)
*H04W 72/04* (2009.01)
(Continued)

(52) U.S. Cl.
CPC ........ *H04W 72/042* (2013.01); *H04B 7/0413* (2013.01); *H04B 7/0626* (2013.01);
(Continued)

(58) Field of Classification Search
CPC ..... H04L 5/001; H04L 5/0048; H04L 5/0092; H04L 5/0023; H04L 5/0064;
(Continued)

(56) References Cited

U.S. PATENT DOCUMENTS

2013/0142268 A1   6/2013  Gao et al.
2013/0258965 A1  10/2013  Geirhofer et al.
(Continued)

FOREIGN PATENT DOCUMENTS

CN         103037524 A      4/2013
CN         103200577 A      7/2013
(Continued)

OTHER PUBLICATIONS

3GPP (views on CSI measurements for LTE TDD eIMTA, R1-135245, Nov. 11-15, 2013, WG1#75).*
(Continued)

*Primary Examiner* — Maharishi V Khirodhar
(74) *Attorney, Agent, or Firm* — Patterson & Sheridan, LLP

(57) ABSTRACT

Certain aspects of the present disclosure relate to techniques and methods for reporting channel state information (CSI) feedback, for example, for UEs capable of supporting evolved interference management traffic adaptation (eIMTA). In one aspect, a method generally includes receiving signaling of a first uplink/downlink (UL/DL) subframe configuration for communicating with a base station (BS), receiving signaling of at least one channel state information (CSI) reporting configuration indicating at least two subframe sets, where each subframe set is associated with an interference measurement resource (IMR) configuration, detecting a collision of CSI reporting for the at least two subframe sets in an uplink subframe, prioritizing one subframe set from the at least two subframe sets for CSI
(Continued)

reporting in the uplink subframe, and reporting CSI in the uplink subframe based on the prioritization.

22 Claims, 16 Drawing Sheets

(51) Int. Cl.

| | | |
|---|---|---|
| *H04L 5/00* | (2006.01) | |
| *H04L 5/14* | (2006.01) | |
| *H04L 29/06* | (2006.01) | |
| *H04B 17/345* | (2015.01) | |
| *H04B 7/0413* | (2017.01) | |
| *H04B 7/06* | (2006.01) | |
| *H04W 24/10* | (2009.01) | |
| *H04W 74/08* | (2009.01) | |
| *H04W 28/06* | (2009.01) | |

(52) U.S. Cl.
CPC ........... *H04B 17/345* (2015.01); *H04L 5/001* (2013.01); *H04L 5/0048* (2013.01); *H04L 5/0092* (2013.01); *H04L 5/1469* (2013.01); *H04L 69/22* (2013.01); *H04W 24/10* (2013.01); *H04W 72/0446* (2013.01); *H04W 74/0858* (2013.01); *H04L 5/0023* (2013.01); *H04L 5/0064* (2013.01); *H04W 28/06* (2013.01)

(58) Field of Classification Search
CPC .............. H04L 5/11469; H04L 5/1469; H04W 72/042; H04W 72/0446; H04W 28/06
See application file for complete search history.

(56) References Cited

U.S. PATENT DOCUMENTS

| | | | |
|---|---|---|---|
| 2013/0301448 A1* | 11/2013 | Sayana ................. | H04W 24/10 370/252 |
| 2013/0301450 A1 | 11/2013 | Geirhofer et al. | |
| 2013/0343301 A1 | 12/2013 | Geirhofer et al. | |
| 2014/0036706 A1 | 2/2014 | Mondal et al. | |
| 2014/0204807 A1 | 7/2014 | Li et al. | |
| 2015/0155928 A1 | 6/2015 | Seo et al. | |
| 2015/0358139 A1* | 12/2015 | Li ......................... | H04W 72/08 370/252 |

FOREIGN PATENT DOCUMENTS

| | | |
|---|---|---|
| CN | 103391124 A | 11/2013 |
| CN | 103490865 A | 1/2014 |
| WO | 2013168969 A1 | 11/2013 |
| WO | 2013169026 A1 | 11/2013 |
| WO | WO-2014109561 A1 | 7/2014 |
| WO | WO-2014171683 A1 | 10/2014 |

OTHER PUBLICATIONS

"3rd Generation Partnership Project; Technical Specification Group Radio Access Network; Evolved Universal Terrestrial Radio Access (E-UTRA); Physical layer procedures (Release 11)", 3GPP Standard; 3GPP TS 36.213, 3rd Generation Partnership Project (3GPP), Mobile Competence Centre; 650, Route Des Lucioles; F-06921 Sophia-Antipolis Cedex; France, vol. RAN WG1, No. V11.3.0, Jun. 25, 2013 (Jun. 25, 2013). pp. 1-176, XP050692859, [retrieved on Jun. 25, 2013].
Supplementary European Search Report—EP15735436—Search Authority—The Hague—dated Aug. 4, 2017.
Texas Instruments: "Views on CSI measurement for LTE TDD eIMTA", 3GPP Draft; R1-135245 TDD EIMTA CSLV2, 3rd Generation Partnership Project (3GPP), Mobile Competence Centre; 650, Route Des Lucioles F-06921 Sophia-Antipolis Cedex ; France, vol. RAN WG1, No. San Francisco, USA; 20131111-20131115 Nov. 13, 2013 (Nov. 13, 2013), XP050734943, Retrieved from the Internet: URL:http://www.3gpp.org/ftp/Meetings_3GPP_SYNC/RAN/RAN1/Docs/ [retrieved on Nov. 13, 2013].
International Search Report and Written Opinion for PCT/CN2015/010179, dated Apr. 1, 2015.
International Search Report and Written Opinion—PCT/CN2014/070233—ISA/EPO—dated Oct. 9, 2014.
International Search Report and Written Opinion—PCT/CN2014/071952—ISA/EPO—dated Oct. 13, 2014.

* cited by examiner

Uplink-downlink configurations.

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

MULTIPLE SUBFRAME SET CSI FEEDBACK

CLAIM OF PRIORITY

The present application for patent claims priority to International application No. PCT/CN2014/070233, filed 7 Jan. 2014, and International application No. PCT/CN2014/071952, filed 11 Feb. 2014, both of which are assigned to the assignee hereof and expressly incorporated herein by reference.

BACKGROUND

Field

The present disclosure relates generally to wireless communication, and more particularly, to methods and apparatus for providing channel state information (CSI) feedback using multiple subframe sets.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Certain aspects of the present disclosure provide a method for wireless communications by a user equipment. The method generally includes receiving signaling of a first uplink/downlink (UL/DL) subframe configuration for communicating with a base station (BS), receiving signaling of at least one channel state information (CSI) reporting configuration indicating at least two subframe sets, where each subframe set is associated with an interference measurement resource (IMR) configuration, detecting a collision of CSI reporting for the at least two subframe sets in an uplink subframe, prioritizing one subframe set from the at least two subframe sets for CSI reporting in the uplink subframe, and reporting CSI in the uplink subframe based on the prioritization.

Certain aspects of the present disclosure provide an apparatus for wireless communications. The apparatus may include at least one processor configured to receive signaling of a first uplink/downlink (UL/DL) subframe configuration for communicating with a base station (BS), receive signaling of at least one channel state information (CSI) reporting configuration indicating at least two subframe sets, where each subframe set is associated with an interference measurement resource (IMR) configuration, detect a collision of CSI reporting for the at least two subframe sets in an uplink subframe, prioritize one subframe set from the at least two subframe sets for CSI reporting in the uplink subframe, and report CSI in the uplink subframe based on the prioritization, and a memory coupled with the at least one processor.

Certain aspects of the present disclosure provide an apparatus for wireless communications. The apparatus generally includes means for receiving signaling of a first uplink/downlink (UL/DL) subframe configuration for communicating with a base station (BS), means for receiving signaling of at least one channel state information (CSI) reporting configuration indicating at least two subframe sets, where each subframe set is associated with an interference measurement resource (IMR) configuration, means for detecting a collision of CSI reporting for the at least two subframe sets in an uplink subframe, means for prioritizing one subframe set from the at least two subframe sets for CSI reporting in the uplink subframe, and means for reporting CSI in the uplink subframe based on the prioritization.

Certain aspects of the present disclosure provide a non-transitory computer readable medium comprising instructions for receiving signaling of a first uplink/downlink (UL/DL) subframe configuration for communicating with a base station (BS), receiving signaling of at least one channel state information (CSI) reporting configuration indicating at least two subframe sets, where each subframe set is associated with an interference measurement resource (IMR) configuration, detecting a collision of CSI reporting for the at least two subframe sets in an uplink subframe, prioritizing one subframe set from the at least two subframe sets for CSI reporting in the uplink subframe, and reporting CSI in the uplink subframe based on the prioritization.

Aspects generally include methods, apparatus, systems, computer program products, and processing systems, as substantially described herein with reference to and as illustrated by the accompanying drawings. "LTE" refers generally to LTE and LTE-Advanced (LTE-A).

BRIEF DESCRIPTION OF THE DRAWINGS

FIG. 8 illustrates an example subframe frame format.

FIG. 14 illustrates an example of collisions between two subframe sets for CSI reporting in an UL subframe, in accordance with certain aspects of the present disclosure.

DETAILED DESCRIPTION

Figure 1:
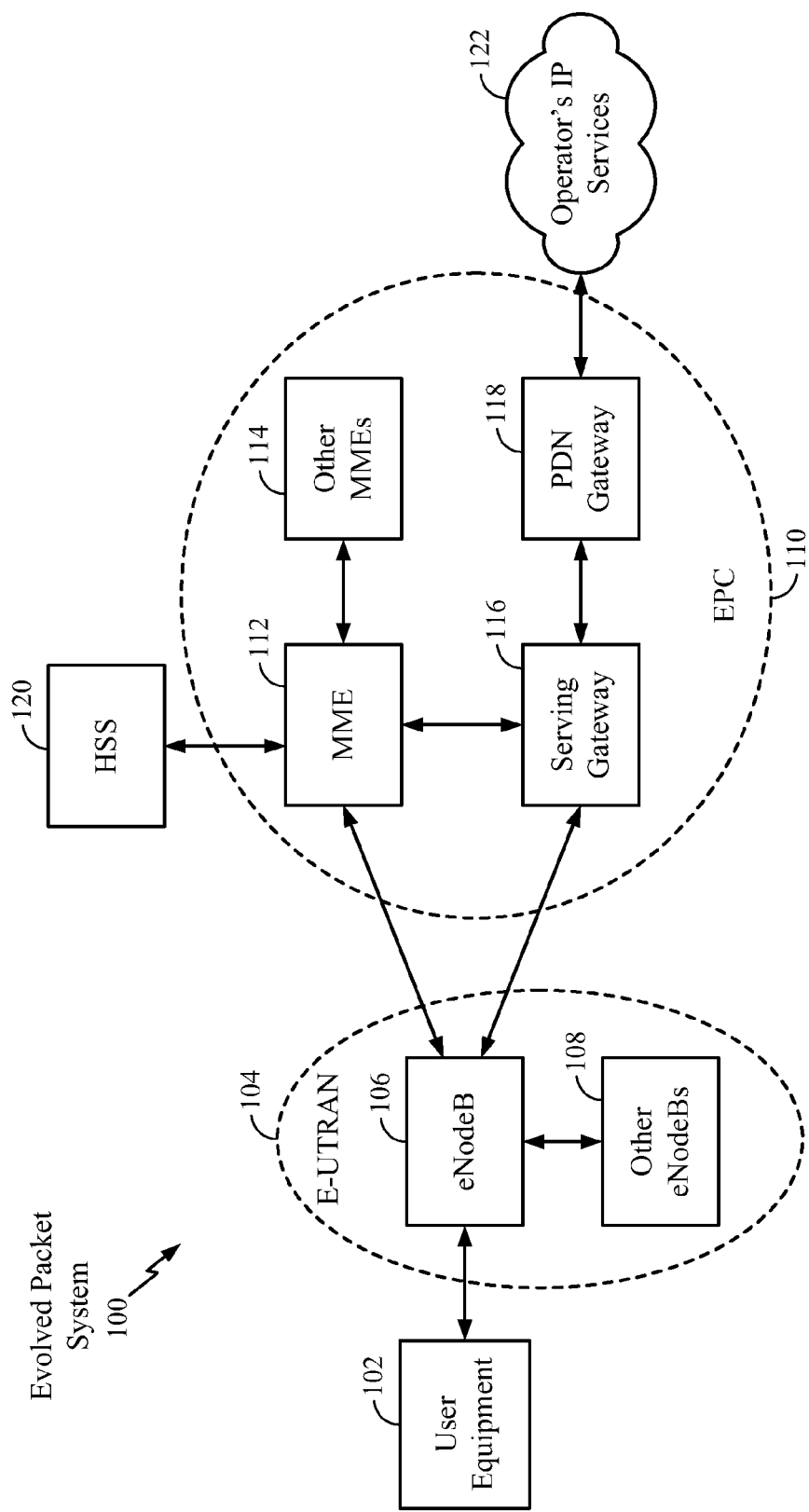
FIG. 1 is a diagram illustrating an example of a network architecture.

In some cases, time division duplexing (TDD) downlink/uplink (DL/UL) subframe configurations are dynamically adapted, for example, based on actual traffic needs and/or to help manage interference. This concept is sometimes referred to as evolved interference management for traffic adaption (eIMTA).

In some cases, however, this adaption may cause issues in channel state information (CSI) measurements and reporting. As an example, in some cases a dynamic reconfiguration may result in a subframe with resources used in reporting CSI changing from DL to UL. As a result, a UE may not have a valid measurement to report. Aspects of the present disclosure provide techniques for addressing such issues with CSI measurements and CSI reporting for UEs capable of supporting dynamic subframe reconfiguration.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software/firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Example Wireless Network

FIG. 1 shows a wireless communication network 100 (e.g., an LTE network), in which aspects of the present disclosure may be performed. For example, UE 102 may utilize the techniques described herein to address collisions that occur in CSI reporting and measurements for eIMTA LTE based communications.

The wireless communication network 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. Exemplary other access networks may include an IP Multimedia Subsystem (IMS) PDN, Internet PDN, Administrative PDN (e.g., Provisioning PDN), carrier-specific PDN, operator-specific PDN, and/or GPS PDN. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), an access point, or some other suitable terminology. The eNB 106 may provide an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a netbook, a smart book, an ultrabook, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include, for example, the Internet, the Intranet, an IP Multimedia Subsystem (IMS), and a PS (packet-switched) Streaming Service (PSS). In this manner, the UE 102 may be coupled to the PDN through the LTE network.

Figure 2:
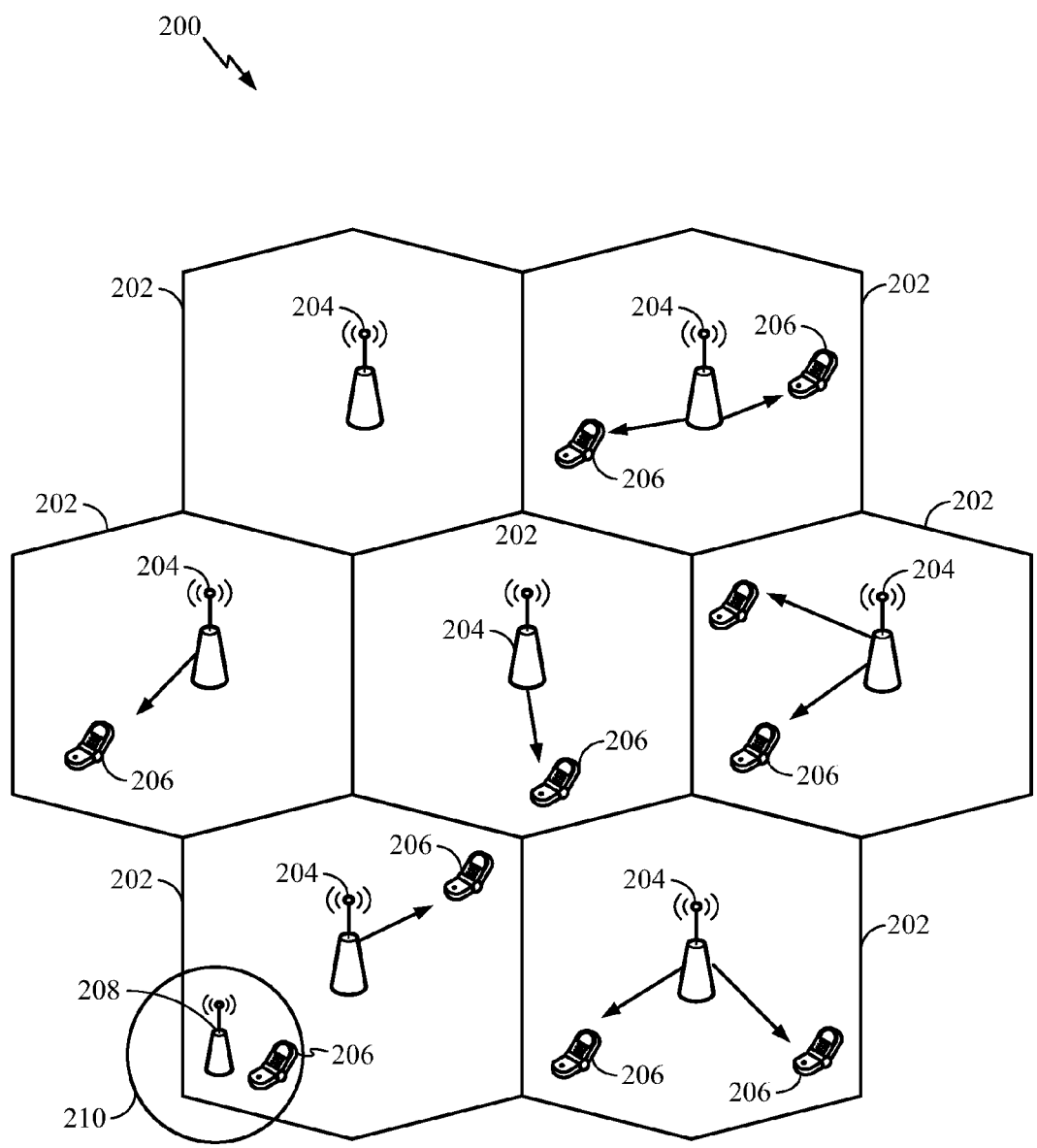
FIG. 2 is a diagram illustrating an example of an access network.

FIG. 2 is a diagram illustrating an example of an access network 200 in an LTE network architecture, in which aspects of the present disclosure may be performed. For example, UE 206 may utilize the techniques described herein to address collisions that occur in CSI reporting and measurements for eIMTA LTE based communications.

In the illustrated example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. The network 200 may also include one or more relays (not shown). According to one application, an UE may serve as a relay.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
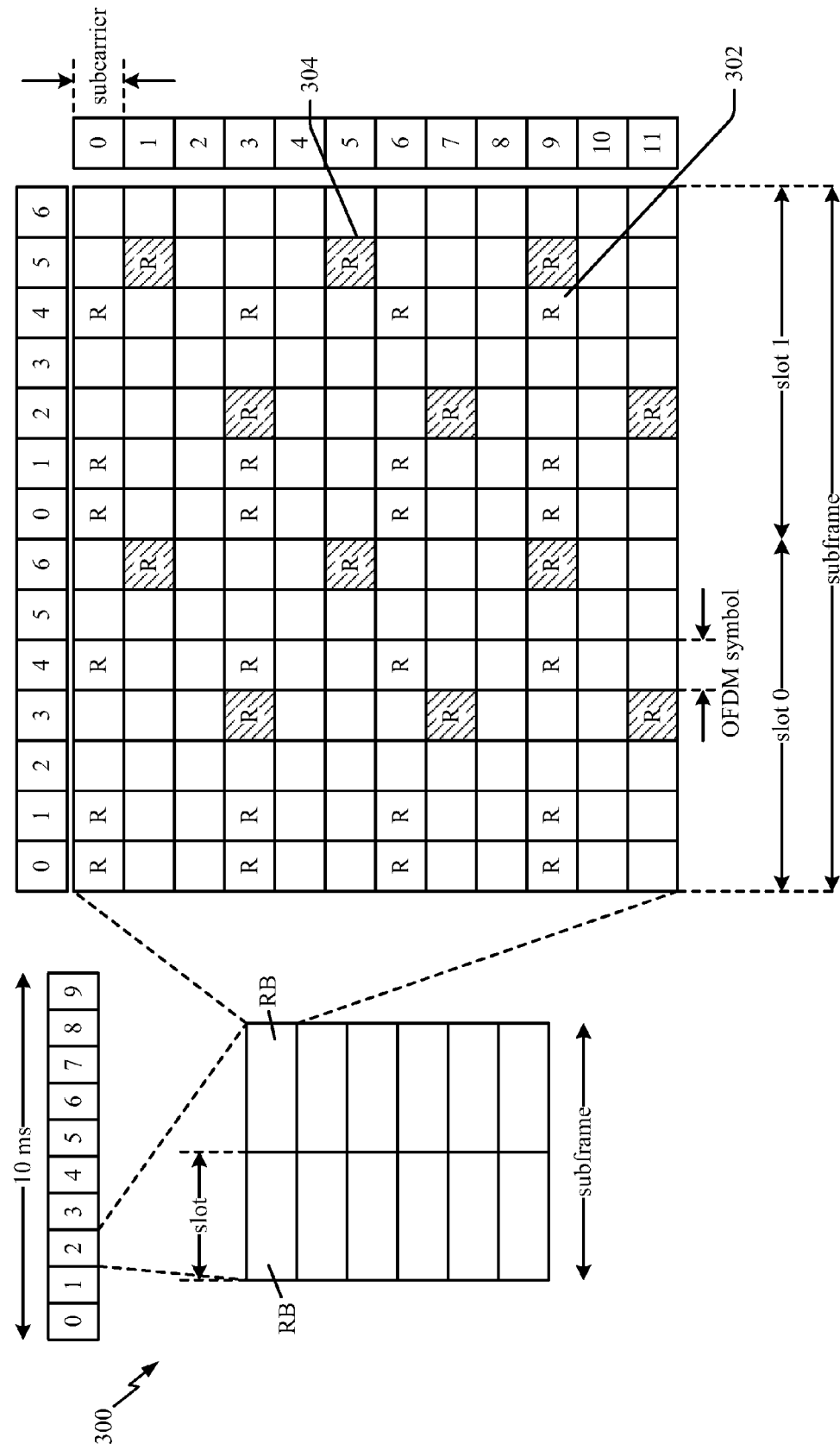
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, R 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH. In aspects of the present methods and apparatus, a subframe may include more than one PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
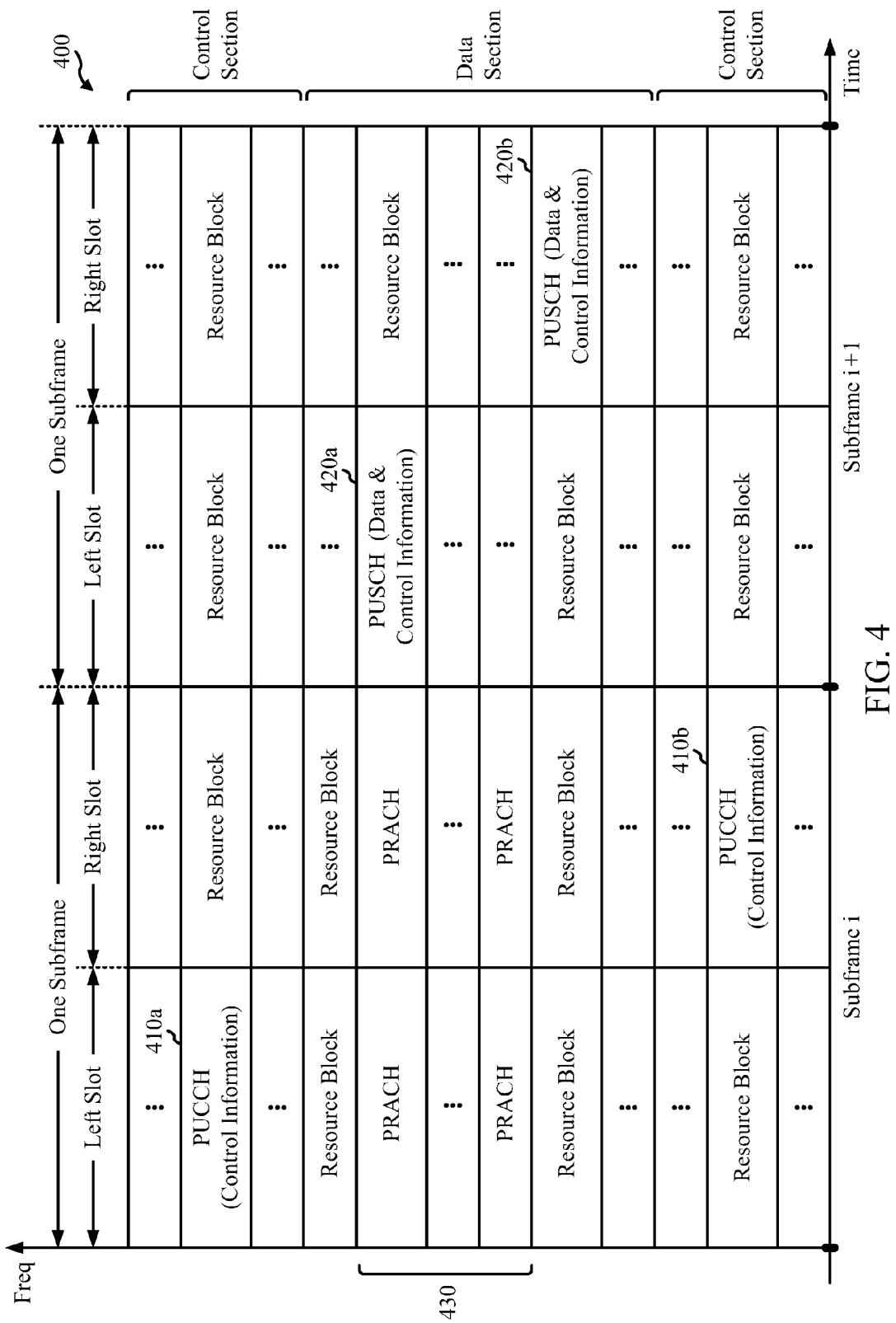
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410*a*, 410*b* in the control section to transmit control information to an eNB. The UE may also be assigned resource blocks 420*a*, 420*b* in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
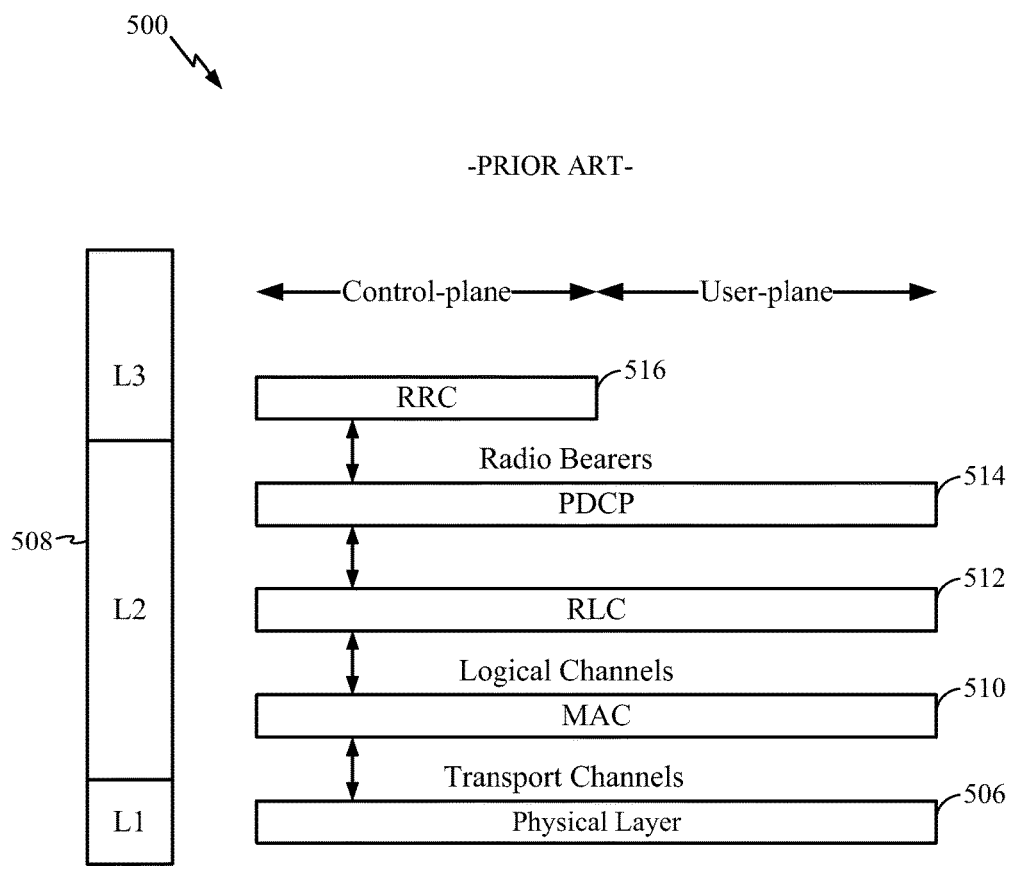
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
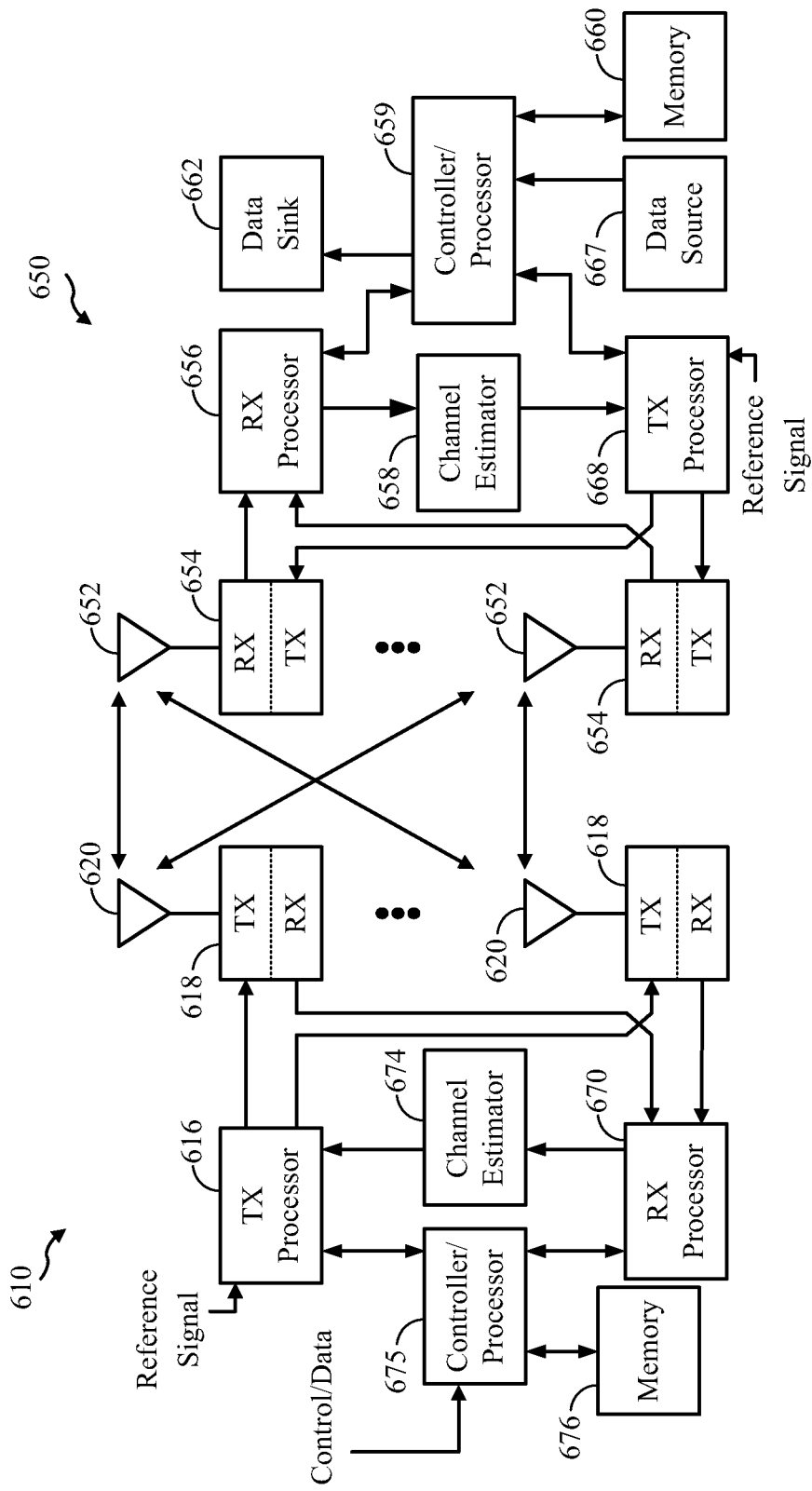
FIG. 6 is a diagram illustrating an example of an evolved Node B and user equipment in an access network, in accordance with certain aspects of the disclosure.

FIG. 6 is a block diagram of an eNB 610 in communication with a UE 650 in an access network, in which aspects of the present disclosure may be performed. For example, UE 650 may utilize the techniques described herein to address collisions that occur in CSI reporting and measurements for eIMTA LTE based communications.

In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

The controllers/processors 675, 659 may direct the operation at the eNB 610 and the UE 650, respectively, to operate in accordance with certain aspects of the present disclosure. For example, the controller/processor 659 and/or other processors and modules at the UE 650 may perform or direct the UE to perform operations 1100 shown in FIG. 11 and/or operations 1300 shown in FIG. 13. Similarly, controller/processor 675 and/or other processors and modules at the eNB 610 may perform or direct the eNB 610 to perform operations 1000 shown in FIG. 10.

Example Subframe Configurations

Figure 7:
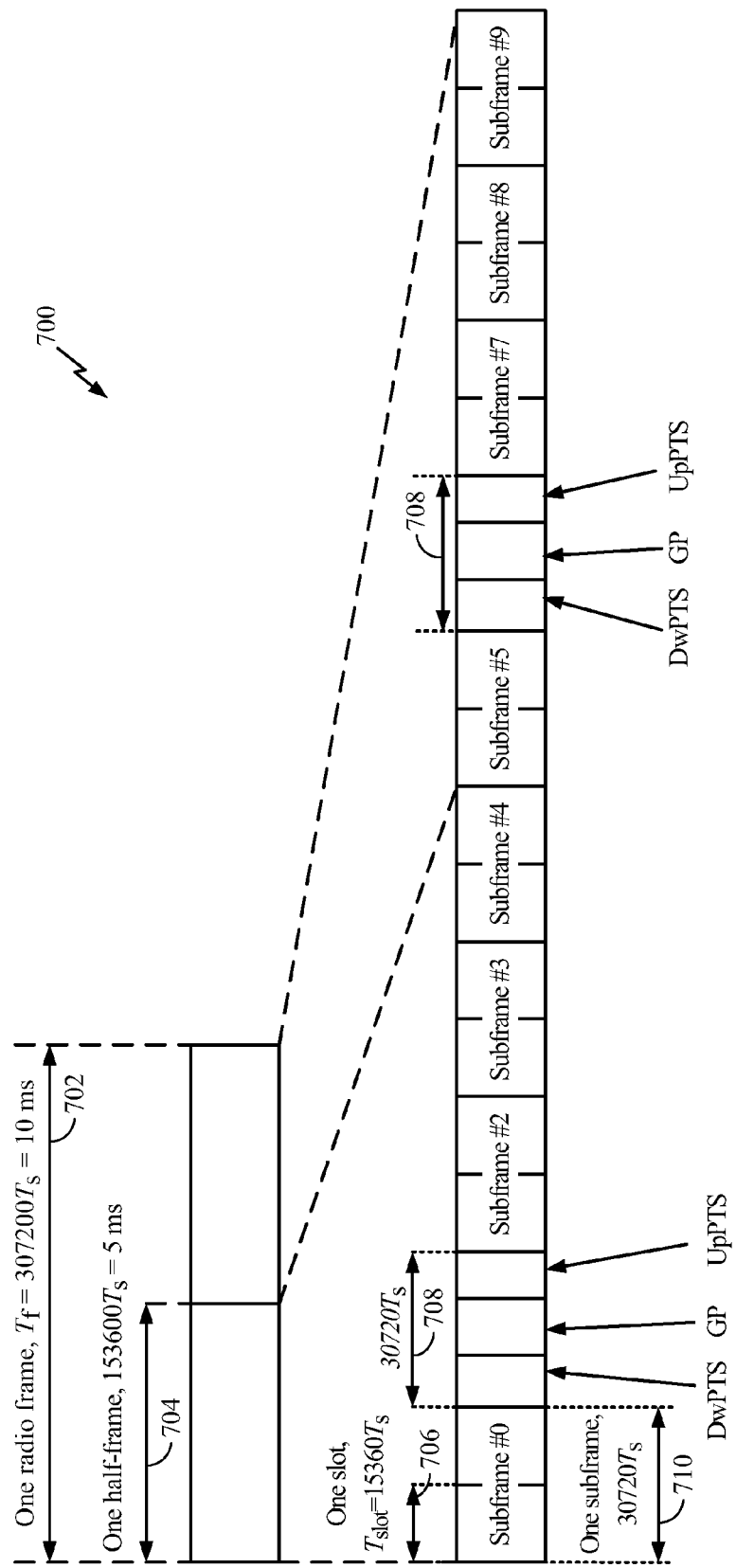
FIG. 7 illustrates a list of uplink/downlink subframe configurations.

FIG. 7 shows an example frame structure 700 for LTE TDD. As shown in FIG. 7, the 10 ms radio frame 702 consists of two half frames 704 of equal length (e.g., 5 ms), with each half frame consisting of 10 slots or 8 slots (e.g. slot 706) plus three special fields DwPTS (downlink pilot time slot, GP (guard period), and UpPTS (uplink pilot time slot) in a special subframe 708. Each slot 706 is 0.5 ms in length and two consecutive slots form exactly one subframe 710.

Within a radio frame, LTE TDD switches multiple times between downlink and uplink transmission and vice versa. The guard period (GP) is inserted between DwPTS and UpPTS when switching from the downlink to the uplink. The duration of the GP depends on the signal propagation time from a base station to a mobile station and back, as well as the time the mobile station requires to switch from receiving to sending. The lengths of the individual special fields depend on an uplink/downlink configuration selected by the network, but the total length of the three special fields remains constant at 1 ms.

In LTE TDD, transmission directions are separated by carrying the UL and DL data in different subframes. Seven possible DL and UL subframe configurations are supported, as shown in Table 800 of FIG. 8.

As shown in column 802 of table 800, the 7 UL/DL configurations are identified by indices 0-6. As shown in column 806, a "D" in a subframe indicates DL data transmission, "U" indicates UL data transmission, and "S" indicates a special subframe having special fields DwPTS, GP, and UpPTS as discussed above with reference to FIG. 7. As shown in column 804, there are 2 switching periodicities, 5 ms and 10 ms. For 5 ms periodicity (e.g., subframe configurations 0-2 and 6), there are two special subframes in one 10 ms frame—as illustrated in FIG. 7. For 10 ms periodicity (e.g., subframe configurations 3-5), there is one special subframe in one frame.

Two Subframe Set CSI Feedback for eIMTA in LTE

UEs that support dynamic subframe configurations, as with eIMTA, may have certain challenges when measuring and reporting CSI. Aspects of the present disclosure provide techniques that may be used for CSI reporting by UEs capable of supporting dynamic subframe reconfiguration.

To facilitate CSI reporting, certain standards (e.g., LTE Release 11) have introduced a DE-specific interference measurement resource (IMR) that allows a UE to report measurements that might help an eNB determine interference conditions. In some cases, UEs may be configured with separate IMRs based on certain parameters, such as the subframeConfig and resourceConfig parameters. The subframeConfig parameter signals which subframes contain the IMR and has a jointly coded periodicity and subframe offset. The resourceConfig parameter identifies which resource elements (REs) are occupied by a non-zero-power (NZP) channel state information reference signal (CSI-RS) resource (i.e., which pattern is used).

In conventional systems, IMR scheduling may be subject to additional constraints. For example, a first constraint is that all IMRs configured for one UE may be a subset of one virtual zero-power (ZP) CSI-RS configuration, which may or may not be actually configured for the specific UE. A second constraint is that each IMR configured for a UE may be covered by at least one configured ZP CSI-RS resource for that UE, but the IMRs configured for a UE do not necessarily have to be covered by the same ZP CSI-RS configuration.

Figure 9:
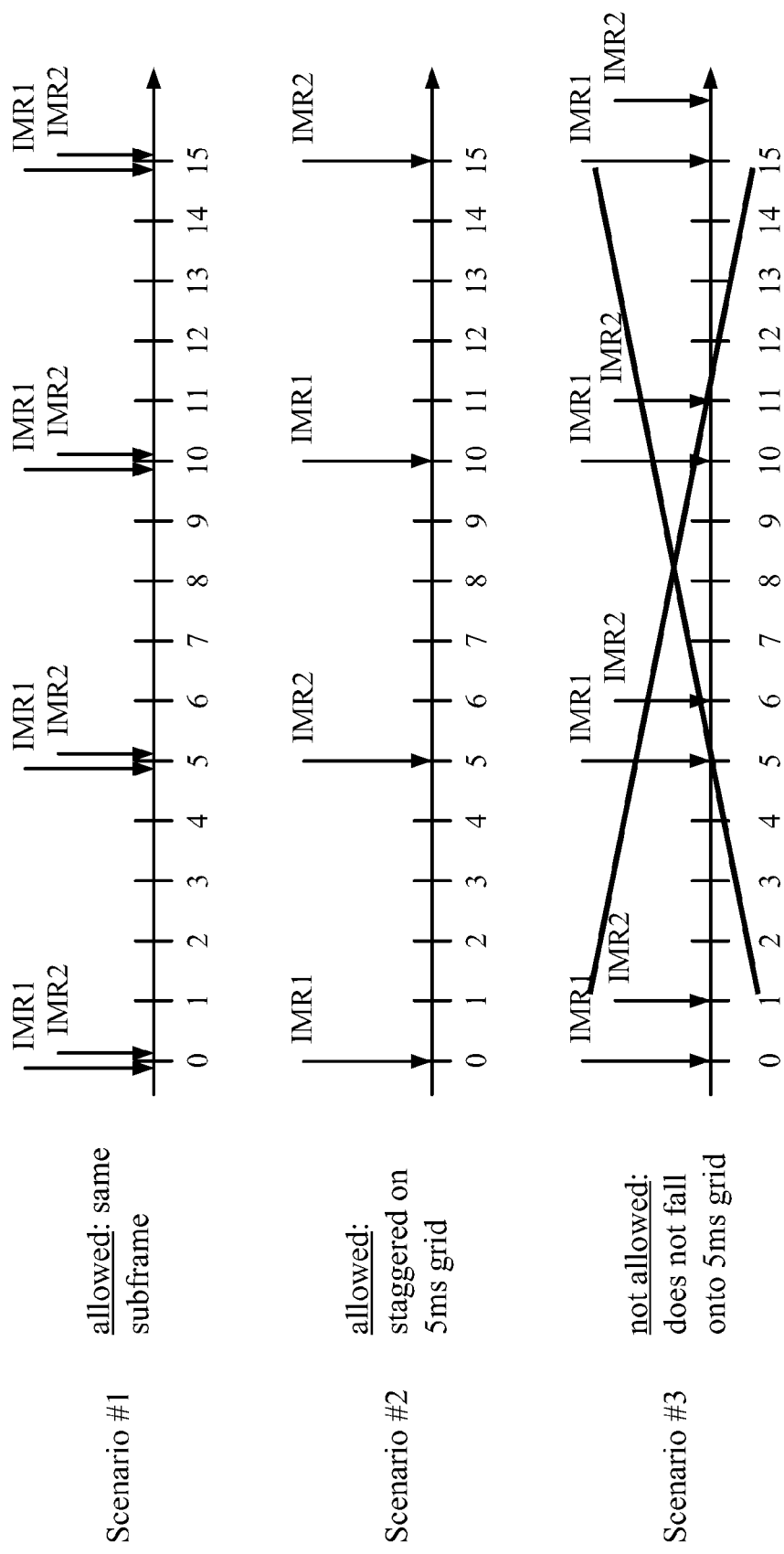
FIG. 9 illustrates different IMR placement scenarios, according to certain aspects of the disclosure.

As illustrated in FIG. 9, the first constraint requires that all IMRs fall onto a 5 ms grid. For example, FIG. 9 illustrates two scenarios of when IMRs are allowed and one scenario of when IMRs are not allowed due to the first constraint noted above. As can be seen in scenario 1, two IMRs (IMR1 and IMR2) may be allowed when they both fall at the same time in the same subframe, and are at multiples of 5 ms. Scenario 2 illustrates that IMR1 and IMR2 are allowed when they are staggered on a 5 ms grid. For example, IMR1 falls at 0 ms and IMR2 falls at 5 ms. Scenario 3 shows an example of when IMRs are not allowed because the two IMRs do not fall on the 5 ms grid.

As noted above, using eIMTA, it may be possible to dynamically adapt TDD DL/UL subframe configurations based on the actual traffic needs and/or for interference management purposes. For example, if during a short duration a large data burst on downlink is needed, the subframe configuration may be changed from, for example, configuration #1, which has six DL subframes and four UL subframes, to configuration #5, which has nine DL subframes and one UL subframe. In some cases, the adaptation of a TDD configuration is expected to be no slower than 640 ms. In an extreme case, the adaption can be as fast as 10 ms.

In some cases, for eIMTA, up to two subframe sets can be UE-specifically signaled to allow separate channel state information (CSI) measurements/reports for either of the two subframe sets. However, in order to support CSI measurements/reports for two types of subframes, the first IMR constraint (that all IMRs fall onto a 5 ms grid) may need be removed for eIMTA. Thus, there may be a need to define when this constraint can be removed, at least for eIMTA capable UEs.

Figure 10:
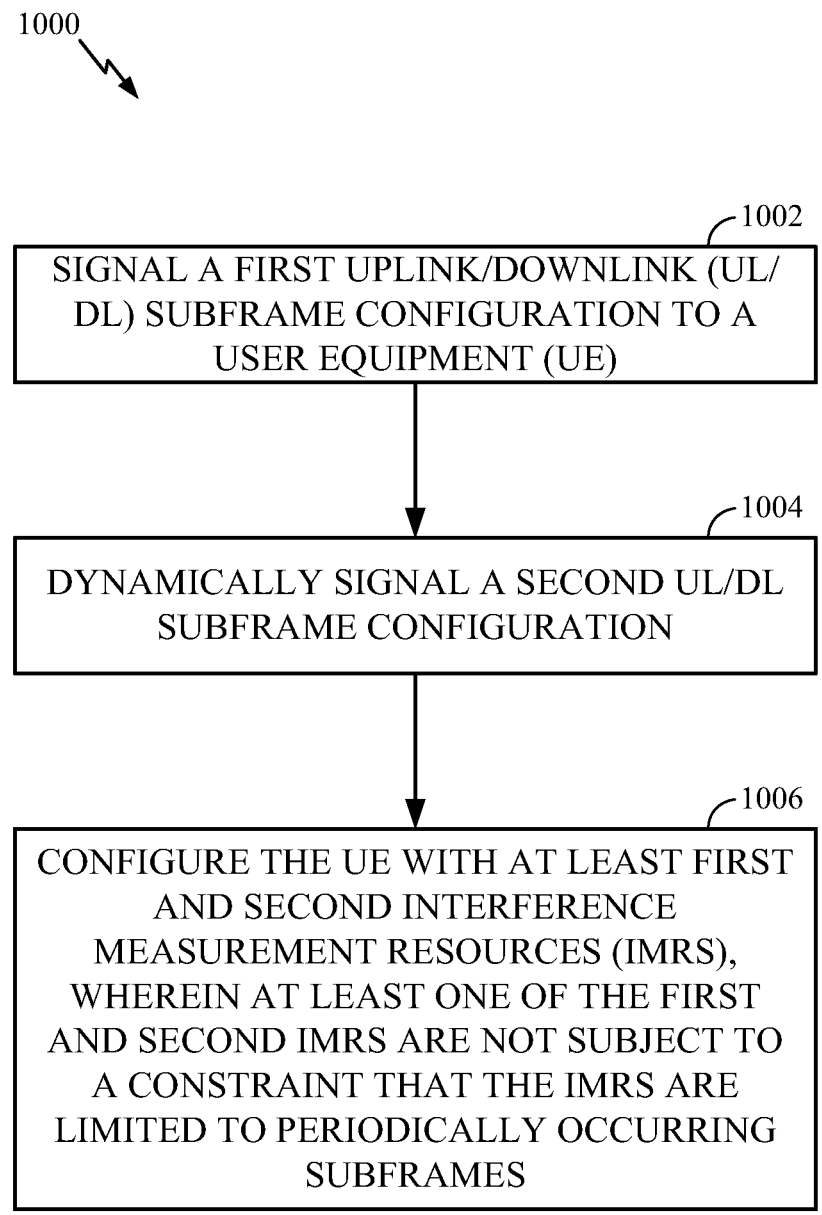
FIG. 10 illustrates example operations 1000 for wireless communications, in accordance with certain aspects of the present disclosure.

FIG. 10 illustrates example operations 1000 for wireless communications, in accordance with aspects of the present disclosure. According to aspects, the operations 1000 may be performed by a base station (e.g., an eNodeB).

The operations 1000 begin, at 1002, by signaling a first uplink/downlink (UL/DL) subframe configuration to a user equipment (UE). At 1004, the BS dynamically signals a second UL/DL subframe configuration. At 1006, the BS configures the UE with at least first and second interference measurement resources (IMRs), wherein at least one of the first and second IMRs are not subject to a constraint that the IMRs are limited to periodically occurring subframes.

Figure 11:
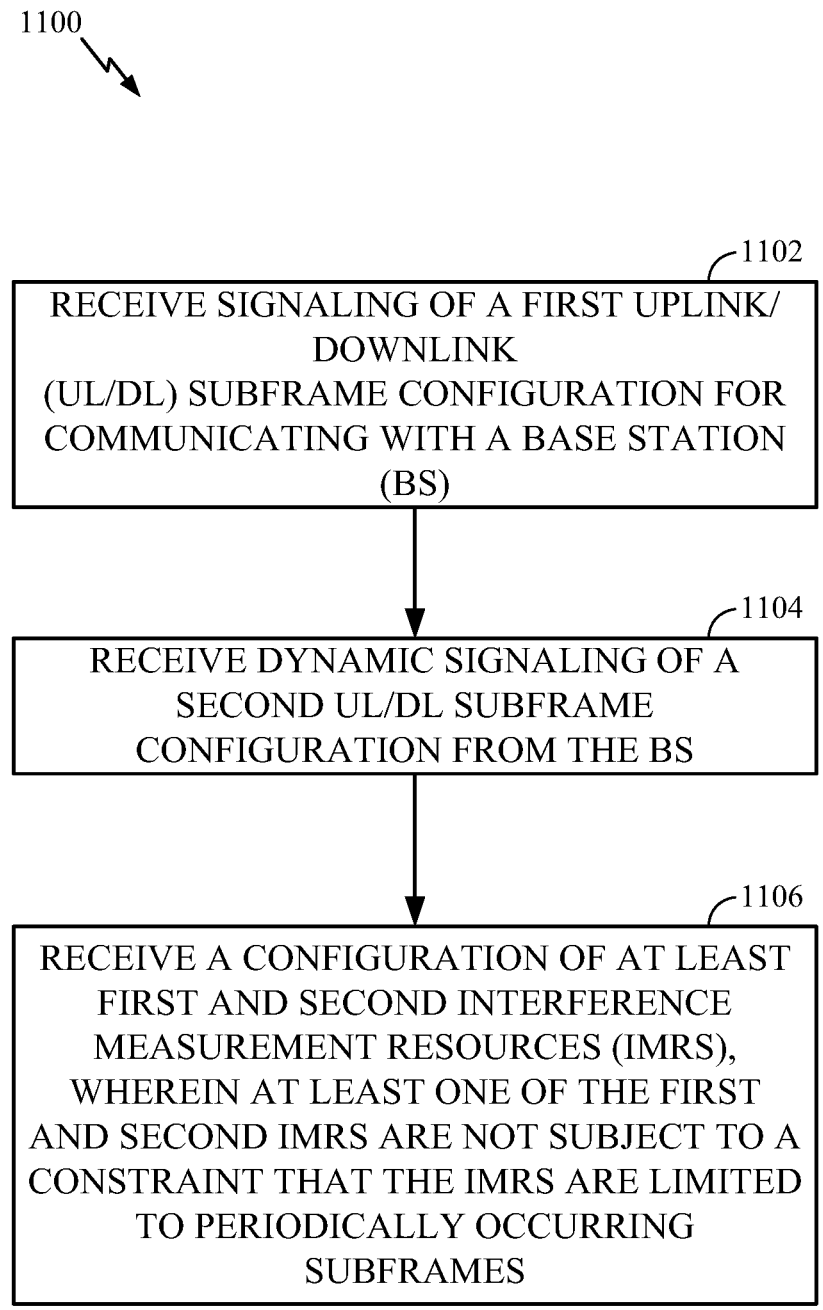
FIG. 11 illustrates example operations 1100 for wireless communications, in accordance with certain aspects of the present disclosure.

FIG. 11 illustrates example operations 1100 for wireless communications, in accordance with aspects of the present disclosure. According to aspects, the operation 1100 may be performed by a UE.

The operations 1100 begin, at 1102, by receiving signaling of a first uplink/downlink (UL/DL) subframe configuration for communicating with a base station (BS). At 1104, the UE receives dynamic signaling of a second UL/DL subframe configuration from the BS. At 1106, the UE receives a configuration of at least first and second interference measurement resources (IMRs), wherein at least one of the first and second IMRs are not subject to a constraint that the IMRs are limited to periodically occurring subframes.

According to certain aspects of the present disclosure, one or more constraints on IMRs may be removed. For example, in some cases, the constraint that IMRs must adhere to a 5 ms grid may be removed for eIMTA capable UEs. In some cases, this constraint may be removed only in flexible subframes (referring to subframes with directions that may be dynamically changed from UL to DL and vice-versa). In some cases, however, it may be beneficial to continue to require that all IMRs fall onto a 5 ms grid, to help accommodate legacy users.

Figure 12:
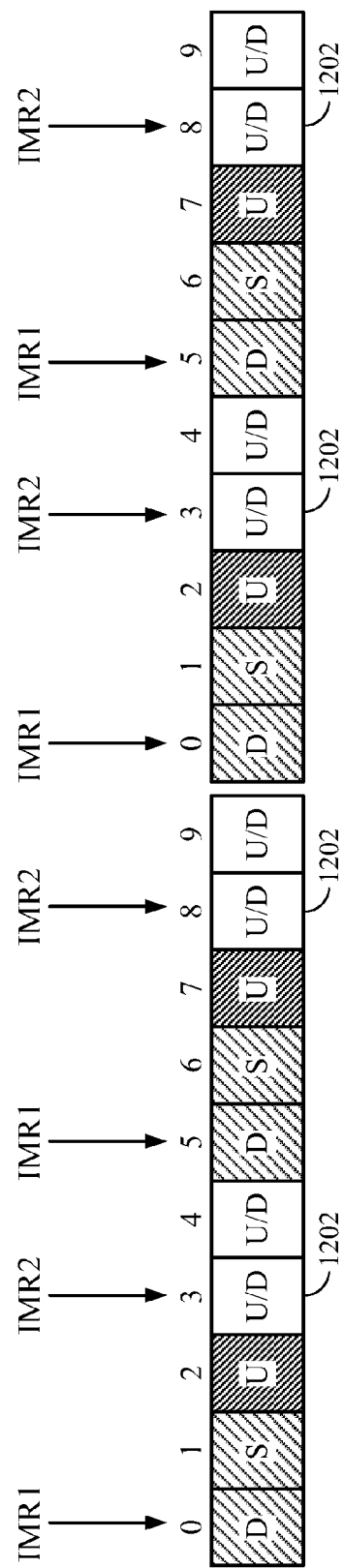
FIG. 12 illustrates placing IMRs in flexible subframes, in accordance with certain aspects of the present disclosure.

However, it may be possible to place a second IMR (IMR-2) in subframes that are not designated as DL subframes in a SIB1 signaled configuration, such as flexible subframes 1202 that are not recognized by legacy UEs. For example, FIG. 12 illustrates that it may be possible to place IMR-2 in flexible subframes 1202 which do not adhere to a 5 ms grid. According to certain aspects, placing IMR-2 in non-SIB1 subframes may ensure that the two IMR configuration only applies to UEs capable of supporting eIMTA.

CSI Reporting Collision Handling

As noted above, eIMTA may cause issues in channel state information (CSI) measurements and reporting.

For example, for certain subframe configurations and CSI reporting configurations, CSI measurements for different CSI reporting processes may be configured to be reported in a same UL subframe (referred to herein as a "collision"). This may present a problem, for example, in scenarios where only a single report can be sent in one UL subframe. Aspects of the present disclosure provide techniques for prioritizing which measurement should be reported.

Further, due to various reasons, the UE may fail to detect a valid DL subframe (or there may be no valid DL subframe) to perform the CSI measurements. For example, due to eIMTA, a DL subframe configured to carry resources for CSI measurement may be dynamically changed to an UL subframe. Aspects of the present disclosure provide techniques for determining how to report CSI in such cases where a current subframe configuration is not consistent (or "collides") with a current CSI configuration, which may also be considered a "collision."

Figure 13:
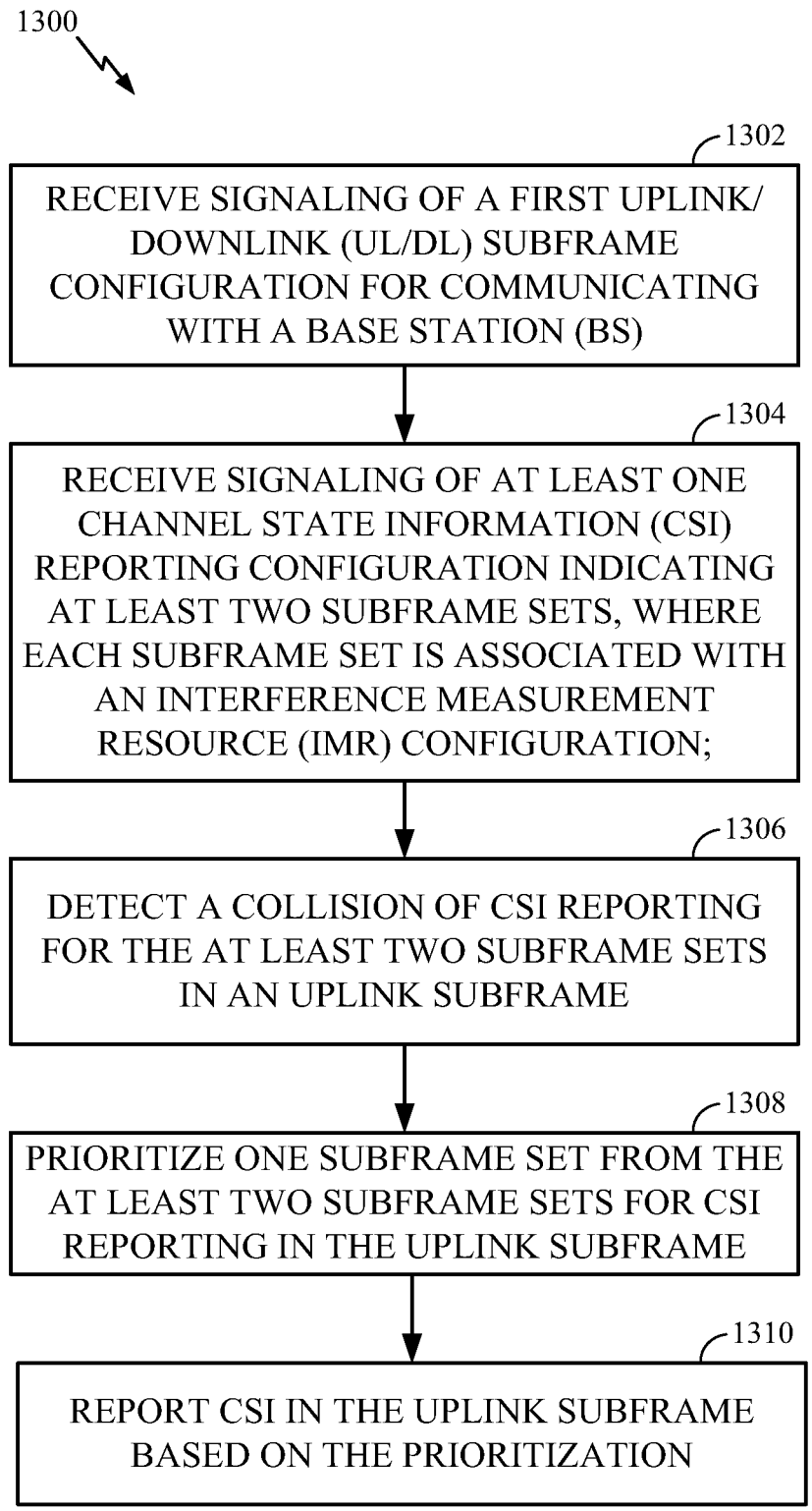
FIG. 13 illustrates example operations 1300 for wireless communication by a user equipment (UE), in accordance with certain aspects of the present disclosure.

FIG. 13 illustrates example operations 1300 for wireless communication, in accordance with aspects of the present disclosure. The operation 1300 may be performed, for example, by a UE capable of supporting eIMTA.

The operations 1300 begin, at 1302, by receiving signaling of a first uplink/downlink (UL/DL) subframe configuration for communicating with a base station (BS). At 1304, the UE receives signaling of at least one channel state information (CSI) reporting configuration indicating at least two subframe sets, where each subframe set is associated with an interference measurement resource (IMR) configuration. At 1306, the UE detects a collision of CSI reporting for the at least two subframe sets in an uplink subframe. At 1308, the UE prioritizes one subframe set from the at least two subframe sets for CSI reporting in the uplink subframe. At 1310, the UE reports CSI in the uplink subframe based on the prioritization.

As described above, periodic CSI reporting for two subframe sets may also be supported under eIMTA. According to certain aspects, when there is a collision between CSI reporting for the two subframe sets (i.e., each subframe set is configured to report in the same UL subframe), one of the subframe sets may be given priority for reporting purposes.

In some cases, a fixed subframe set CSI (with CSI to be measured on subframes that are "fixed" as DL subframes as opposed to "flexible" subframes that may be reconfigured) may be given a higher priority. This may be necessary because, for periodic CSI reports sent on PUCCH, only one report may be transmitted on PUCCH and all others may be dropped.

Aspects of the present disclosure provide different options to prioritize reporting when a collision between the periodic CSI process is detected. For example, for collisions within a component carrier (CC), prioritization may be performed based on the following order: considering first reporting type (e.g. RI/PTI/CQI), then the CSI subframe set (e.g., CSI0 or CSI1), then the CSI process index. For collisions across various CCs, for eIMTA with carrier aggregation (CA), prioritization may also consider the particular CC. For example prioritization for CA eIMTA may be performed based on the following order: considering first reporting type, then the CSI subframe set, then the CSI process index, and finally the CC index. According to certain aspects, CSI reporting for fixed subframes may be considered as CSI process ID #0, which may allow existing collision handling rules to be reused for eIMTA.

Figure 14:
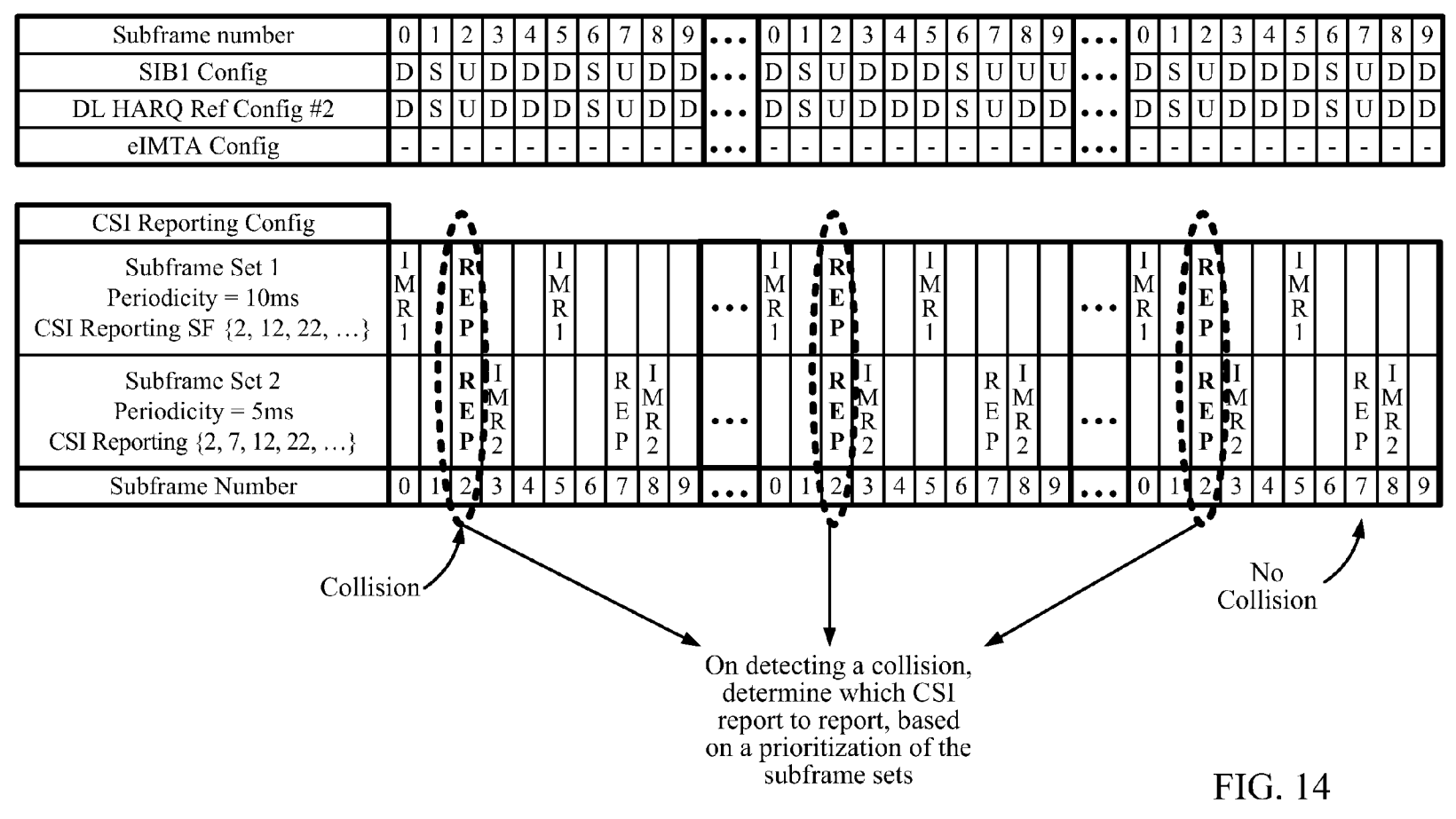

FIG. 14 illustrates an example of collisions between two subframe sets for CSI reporting. In the illustrated example, a first subframe set (Subframe Set 1) has a 10ms reporting periodicity and is configured for reporting CSI measurements in subframes 2, 12, 22, and so on. A second subframe set (Subframe Set 2) has a 5 ms CSI reporting periodicity and is configured to report CSI measurements in subframes 2, 7, 12, 17, 22, and so on. Thus, as illustrated, Subframe Sets 1 and 2 are both configured to report CSI in subframes 2, 12, and 22, resulting in a collision.

As noted above, a collision between subframe sets may occur when both subframe sets are configured to report CSI measurements in the same UL subframe. In order to resolve this collision, a UE may determine which subframe set should be prioritized for CSI reporting in the colliding UL subframe. When only one subframe set (e.g., Subframe Set 2) is configured to report CSI measurements within a particular UL subframe (e.g., UL SFs 7, 17, and 27), no collision occurs and the UE may report CSI for that subframe set.

For both periodic CSI (P-CSI) and aperiodic CSI (A-CSI) (i.e., non-periodic) reporting, a UE may need a valid DL subframe (with resources allocated for reference signals) to measure CSI. A DL subframe may be considered as valid, for example, if it is configured as a downlink subframe for a particular UE, it does not fall within a configured measurement gap for that particular UE, and it is an element of the CSI subframe set linked to the CSI report. According to certain aspects, if there is no valid downlink subframe for the CSI measurement in a serving cell, a CSI report may be omitted for the serving cell in the corresponding uplink subframe (in which that CSI would have been reported).

According to certain aspects, for normal TDD operation, parameters to determine whether a DL subframe is valid may be semi-statically configured, which reduces the ambiguity between the eNB and UE. However, for TDD eIMTA, there may be dynamic configuration of subframe direction between UL and DL. If a UE fails to decode layer 1 (L1) signaling for dynamic configuration, misalignment may occur between the eNB and UE, in terms of the subframe direction, thus affecting CSI measurement and reporting. For example, the eNB may dynamically signal to the UE a new subframe configuration, including at least one DL subframe in which the UE is expected to make CSI measurements. However, if the UE fails to properly decode the dynamic signaling, the UE may think that the at least one DL subframe is an UL subframe and may fail to make the CSI measurements.

Various approaches may be used for CSI measurement for TDD eIMTA. According to one approach, when a UE decodes explicit L1 signaling of reconfiguration correctly and detects a valid UL-DL configuration, the UE may measure CSI only within the subframes indicated as DL subframe or special subframe by the explicit L1 signaling of reconfiguration. On the other hand, if the UE does not detect L1 signaling conveying a valid UL-DL configuration for a radio frame, the UE may measure CSI only within the subframes indicated as DL subframe or special subframe by a SIB configuration, which may be considered as fallback operation (i.e., when the UE fails to decode the L1 signaling, the UE may fall back to the SIB configuration).

However, the above approach to CSI reporting may result in CSI for flexible DL subframes being omitted if the UE does not detect L1 signaling conveying a valid UL/DL configuration. This may cause ambiguity to an eNB which expects CSI reported by the UE but does not actually receive a CSI report from the UE (e.g., due to fallback operation described above). This may also affect PUSCH decoding when CSI is multiplexed on PUSCH, especially for multiple component carriers (CCs) configured for one UE since the PUSCH data rate matching is highly dependent on the number of aggregated CSI bits and the number of aggregated CCs for CSI report.

According to certain aspects, a UE may take action to determine how to report when it has no valid DL subframe to measure. For example, the UE may send an outdated CSI measurement for periodic CSI report when a CSI DL reference subframe is reconfigured from DL to UL. This may also be applied to aperiodic CSI (A-CSI) reports. For example, a UE may report a previous CSI value or an out-of-range (OOR) CSI value when the UE receives an A-CSI trigger and the CSI measurement reference subframe is changed from DL to UL. However, this may violate an existing condition for CSI reporting (i.e., that CSI measurements are based on the valid DL subframe). Thus, it may be beneficial to not solely base CSI reporting on the condition of a valid DL subframe used for CSI measurement.

According to certain aspects, a UE may omit a CSI report, report a previous CSI measurement, or report with a value that is out of range (OOR) when there is no valid DL subframe for CSI measurement. This new definition may be also extended to multi-CCs (i.e., multiple component carriers) in which the DL HARQ reference configuration is CC specific. Determining a valid DL subframe for CSI measurements from an RRC configured DL HARQ reference configuration may provide alignment between eNB and UE in terms of CSI reporting during UE fallback operation since DL reference configuration is semi-statically configured.

Figure 15:
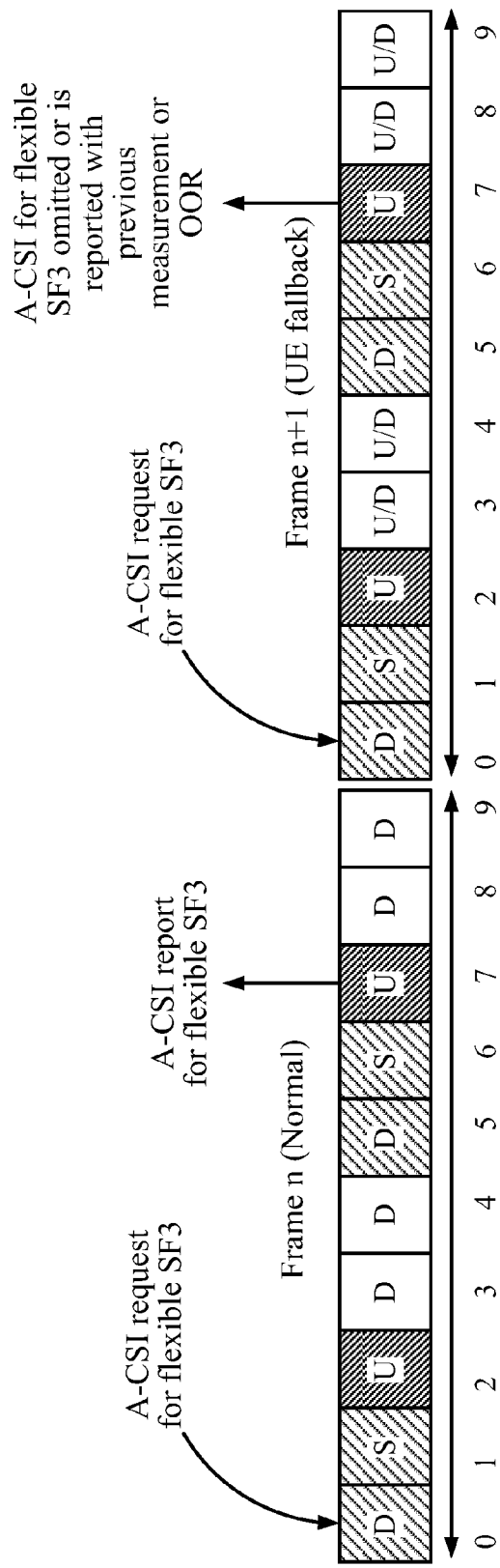
FIG. 15 illustrates options for reporting when a valid DL subframe for measurement does not exist, in accordance with certain aspects of the present disclosure.

FIG. 15 illustrates an example of a collision occurring for CSI measurements and how a UE may determine whether a valid DL subframe exists for CSI reporting, in accordance with certain aspects of the present disclosure.

The illustrated example assumes that subframes (SFs) 0, 1, 5, and 6 are fixed DL SFs and SFs 2 and 7 are fixed UL SFs. The example further assumes that the remaining subframes are flexible SFs that may be UL or DL depending on a dynamic indicator. According to certain aspects, at Frame n, a UE may detect and properly decode dynamic indicator for Frame n in DL SF 0. The UE may then report A-CSI during UL SF 7 with CSI measured in flexible DL SF 3.

According to further aspects, at Frame n+1, a UE may fail to decode the dynamic indicator and may enter SIB fallback operation where flexible SF3 may be assumed to be UL although it is actually used as DL by the eNB. In this instance, the UE may assume that there is no valid DL subframe for CSI reporting. Based on the existing CSI reporting condition, the UE may omit CSI reporting during SF 7 (for CSI measurement on SF3) although it is requested by the eNB because no valid DL subframe exists.

However, according to certain aspects, the UE may know to report CSI in SF 7, since SF 3 is a valid DL subframe for CSI reporting based on DL HARQ reference configuration 2, as illustrated in FIG. 14. Thus, even if a valid DL subframe does not exist for CSI reporting, the UE may still transmit a CSI report (e.g., with a measurement value that is outdated or OOR) rather than CSI measurements taken SF 3.

Figure 16:
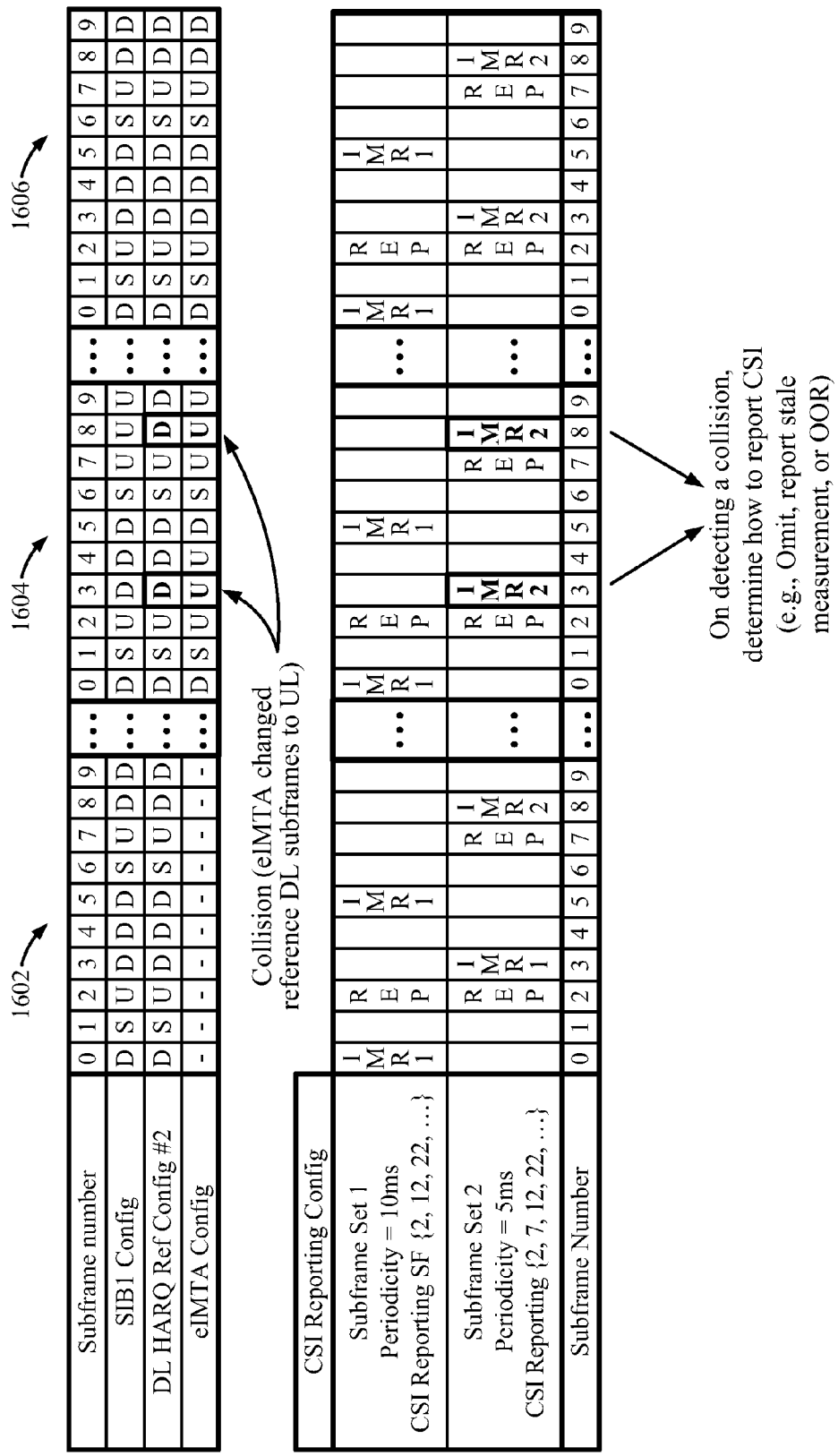
FIG. 16 illustrates how an IMR subframe may change from DL to UL do to dynamic subframe reconfiguration, in accordance with certain aspects of the present disclosure.

FIG. 16 further illustrates how a UE may lack a valid DL subframe for CSI reporting due to eIMTA. As with the example shown in FIG. 14, the example shown in FIG. 16 assumes that CSI measurements for Subframe Set 2 are configured to take place in subframes 3 and 8 (IMR2 is in SF3 and SF8). The example also assumes that the DL HARQ reference configuration is based on subframe configuration 2 (DSUDDDSUDD).

At a first frame 1602, as indicated by the dashes in SFs 0-9, the UE may not have yet received a dynamic indicator (i.e., an L1 dynamically signaled eIMTA configuration). In this case, the UE may rely on the SIB1 configuration to determine whether a collision occurred and whether a valid DL subframe exists. As illustrated in Frame 1602, both the SIB1 configuration and the DL HARQ reference configuration indicate subframes 3 and 8 as a downlink subframe. Thus, in this instance, the UE has a valid DL subframe for CSI measurements (which may be considered as no collision). Thus, the UE may measure CSI in subframes 3 and 8 and subsequently report the CSI based on those measurements (e.g., report in SF7 and SF 12, respectively).

In Frame 1604, however, the UE receives and properly decodes an eIMTA subframe configuration (e.g., indicating SF config. #6). In this case, the reconfiguration has changed SF3 and SF8 from DL to UL. As a result, the UE has no valid DL subframe for CSI reporting. Thus, the UE may consider this a collision (as the dynamic SF configuration collides with the CSI reporting configuration) and report accordingly (e.g., omit a report, report a previous measurement, or report an OOR value).

In some cases, the UE may continue to report in this manner until a valid DL subframe is again detected. For example, UE may rely on the eIMTA configuration to determine whether a collision exists for CSI measurements and whether a valid DL subframe exists. As illustrated in a subsequent frame 1604, the eIMTA configuration may again change subframes 3 and 8 to DL subframes (e.g., changing back to TDD configuration #2). As a result, the UE may again report a valid- and current-measurement.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. A phrase referring to "at least one of" a list of items refers to any combination of those items, including single members. As an example, "at least one of: a, b, or c" is intended to cover: a, b, c, a-b, a-c, b-c, and a-b-c, as well as any combination of those items including multiple of the same member (e.g., aa, bb, cc, aa-b, etc.).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The various operations of methods described above may be performed by any suitable means capable of performing the corresponding functions. The means may include various hardware and/or software component(s) and/or module(s), including, but not limited to a circuit, an application specific integrated circuit (ASIC), or processor.

For example, means for receiving may comprise a receiver (e.g., the receiver 654RX) and/or an antenna(s) 652 of the user equipment 650 illustrated in FIG. 6. Means for detecting and means for prioritizing may comprise a processing system, which may include one or more processors, such as the RX processor 656 and/or the controller/processor 659 of the user equipment 650. Means for reporting may comprise a transmitter (e.g., transmitter 654TX) and/or an antenna(s) 652 of the user equipment 650.

What is claimed is:

1. A method for wireless communications by a user equipment (UE), comprising:
receiving signaling of a first uplink/downlink (UL/DL) subframe configuration for communicating with a base station (BS), wherein the first UL/DL subframe configuration is signaled via a system information block (SIB);
receiving signaling of at least one channel state information (CSI) reporting configuration indicating at least two subframe sets, where each subframe set is associated with an interference measurement resource (IMR) configuration;
detecting a collision of CSI reporting for the at least two subframe sets in an uplink subframe;
prioritizing one subframe set from the at least two subframe sets for CSI reporting in the uplink subframe; and
reporting CSI in the uplink subframe based on the prioritization,
wherein interference measurement resources corresponding to at least two IMRs are not subject to a constraint that the at least two IMRs are limited to periodically occurring subframes,
wherein at least one of a first IMR and a second IMR in the at least two IMRs are only within DL subframes according to the first UL/DL subframe configuration, and
wherein at least one of the first IMR and the second IMR in the at least two IMRs are not subject to the constraint in DL subframes that were not DL subframes in the first UL/DL subframe configuration.

2. The method of claim 1, wherein the at least two subframe sets are associated with a same CSI process.

3. The method of claim 1, wherein a subframe set with a lowest set subframe set index, among the subframe sets under collision in the uplink subframe, is given a higher priority.

4. The method of claim 1, wherein the CSI reporting configuration comprises of one or more CSI processes for one or more component carriers, and the prioritization of CSI reporting is further based on at least one of a CSI reporting type, a CSI process index, or a component carrier index.

5. The method of claim 1, wherein the CSI reporting is of a periodic CSI reporting type.

6. The method of claim 1, wherein the first UL/DL subframe configuration is signaled via a system information block (SIB).

7. The method of claim 1, further comprising: receiving an indication indicating a second UL/DL subframe configuration, which is more dynamic than the first UL/DL subframe configuration.

8. The method of claim 7, wherein the detecting the collision comprises: determining a downlink reference subframe for the CSI reporting based on the dynamically signaled second UL/DL subframe configuration.

9. The method of claim 8, wherein:
determining the downlink reference subframe is an uplink subframe;
altering CSI reporting in response to the detection of the collision, where the altering comprises at least one of sending a measurement report with a value that is at least one of: outdated or out of range, or omitting a CSI report.

10. The method of claim 1, wherein the at least one of the first IMR and the second IMR in the at least two IMRs are only within the DL subframes according to the first UL/DL subframe configuration is associated with a lowest subframe set index.

11. An apparatus for wireless communication, comprising:
at least one processor configured to:
receive signaling of a first uplink/downlink (UL/DL) subframe configuration for communicating with a base station (BS), wherein the first UL/DL subframe configuration is signaled via a system information block (SIB);
receive signaling of at least one channel state information (CSI) reporting configuration indicating at least two subframe sets, where each subframe set is associated with an interference measurement resource (IMR) configuration;
detect a collision of CSI reporting for the at least two subframe sets in an uplink subframe;
prioritize one subframe set from the at least two subframe sets for CSI reporting in the uplink subframe; and
report CSI in the uplink subframe based on the prioritization; and
a memory coupled with the at least one processor,
wherein interference measurement resources corresponding to at least two IMRs are not subject to a constraint that the at least two IMRs are limited to periodically occurring subframes,
wherein at least one of a first IMR and a second IMR in the at least two IMRs are only within DL subframes according to the first UL/DL subframe configuration, and
wherein at least one of the first IMR and the second IMR in the at least two IMRs are not subject to the constraint in DL subframes that were not DL subframes in the first UL/DL subframe configuration.

12. The apparatus of claim 11, wherein the at least two subframe sets are associated with a same CSI process.

13. The apparatus of claim 11, wherein a subframe set with a lowest set subframe set index, among the subframe sets under collision in the uplink subframe, is given a higher priority.

14. The apparatus of claim 11, wherein the CSI reporting configuration comprises of one or more CSI processes for one or more component carriers, and the prioritization of CSI reporting is further based on at least one of a CSI reporting type, a CSI process index, or a component carrier index.

15. The apparatus of claim 11, wherein the CSI reporting is of a periodic CSI reporting type.

16. The apparatus of claim 11, wherein the first UL/DL subframe configuration is signaled via a system information block (SIB).

17. The apparatus of claim 11, wherein the at least one processor is further configured to: receive an indication indicating a second UL/DL subframe configuration, which is more dynamic than the first UL/DL subframe configuration.

18. The apparatus of claim 17, wherein the at least one processor configured to detect a collision determines a downlink reference subframe for the CSI reporting based on the dynamically signaled second UL/DL subframe configuration.

19. The apparatus of claim 18, wherein the at least one processor configured to determine a downlink reference subframe determines the downlink reference subframe is an uplink subframe and alters CSI reporting in response to the detection of the collision, wherein the at least one processor configured to alter CSI reporting is configured to send a measurement report with a value that is at least one of: outdated or out of range, or omit a CSI report.

20. The apparatus of claim 11, wherein the at least one of the first IMR and the second IMR in the at least two IMRs are only within the DL subframes according to the first UL/DL subframe configuration is associated with a lowest subframe set index.

21. An apparatus for wireless communications, comprising:
means for receiving signaling of a first uplink/downlink (UL/DL) subframe configuration for communicating with a base station (BS), wherein the first UL/DL subframe configuration is signaled via a system information block (SIB);
means for receiving signaling of at least one channel state information (CSI) reporting configuration indicating at least two subframe sets, where each subframe set is associated with an interference measurement resource (IMR) configuration;
means for detecting a collision of CSI reporting for the at least two subframe sets in an uplink subframe;
means for prioritizing one subframe set from the at least two subframe sets for CSI reporting in the uplink subframe; and
means for reporting CSI in the uplink subframe based on the prioritization,
wherein interference measurement resources corresponding to at least two IMRs are not subject to a constraint that the at least two IMRs are limited to periodically occurring subframes,
wherein at least one of a first IMR and a second IMR in the at least two IMRs are only within DL subframes according to the first UL/DL subframe configuration, and
wherein at least one of the first IMR and the second IMR in the at least two IMRs are not subject to the constraint in DL subframes that were not DL subframes in the first UL/DL subframe configuration.

22. A non-transitory computer readable medium comprising instructions stored thereon, the instructions comprising instructions for:
receiving signaling of a first uplink/downlink (UL/DL) subframe configuration for communicating with a base station (BS), wherein the first UL/DL subframe configuration is signaled via a system information block (SIB);
receiving signaling of at least one channel state information (CSI) reporting configuration indicating at least two subframe sets, where each subframe set is associated with an interference measurement resource (IMR) configuration;
detecting a collision of CSI reporting for the at least two subframe sets in an uplink subframe;
prioritizing one subframe set from the at least two subframe sets for CSI reporting in the uplink subframe; and
reporting CSI in the uplink subframe based on the prioritization,
wherein interference measurement resources corresponding to at least two IMRs are not subject to a constraint that the at least two IMRs are limited to periodically occurring subframes,
wherein at least one of a first IMR and a second IMR in the at least two IMRs are only within DL subframes according to the first UL/DL subframe configuration, and
wherein at least one of the first IMR and the second IMR in the at least two IMRs are not subject to the constraint in DL subframes that were not DL subframes in the first UL/DL subframe configuration.

* * * * *